United States Patent
Kim et al.

(10) Patent No.: US 9,606,658 B2
(45) Date of Patent: Mar. 28, 2017

(54) DISPLAY DEVICE WITH INTEGRATED TOUCH SCREEN AND DRIVING METHOD THEREOF

(71) Applicant: LG Display Co., Ltd., Seoul (KR)

(72) Inventors: Sun Yeop Kim, Seoul (KR); Jae Sung Yu, Seoul (KR); Young Joon Lee, Goyang-si (KR); Nam Hun Oh, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 204 days.

(21) Appl. No.: 14/496,907

(22) Filed: Sep. 25, 2014

(65) Prior Publication Data

US 2015/0185936 A1    Jul. 2, 2015

(30) Foreign Application Priority Data

Dec. 31, 2013 (KR) .................. 10-2013-0169317

(51) Int. Cl.
*G06F 3/044* (2006.01)
*G06F 3/041* (2006.01)

(52) U.S. Cl.
CPC .......... *G06F 3/0412* (2013.01); *G06F 3/044* (2013.01); *G06F 3/0416* (2013.01)

(58) Field of Classification Search
None
See application file for complete search history.

(56) References Cited

U.S. PATENT DOCUMENTS

| | | | |
|---|---|---|---|
| 7,859,521 B2 | 12/2010 | Hotelling et al. | |
| 2010/0194695 A1* | 8/2010 | Hotelling | G06F 3/0412 345/173 |
| 2012/0133612 A1 | 5/2012 | Wang et al. | |
| 2012/0162121 A1* | 6/2012 | Chang | G06F 3/0416 345/174 |
| 2012/0249444 A1 | 10/2012 | Lee et al. | |
| 2013/0147724 A1* | 6/2013 | Hwang | G06F 3/0412 345/173 |
| 2013/0241868 A1* | 9/2013 | Kim | G09G 3/3685 345/174 |
| 2013/0335342 A1* | 12/2013 | Kim | G06F 3/044 345/173 |

(Continued)

FOREIGN PATENT DOCUMENTS

GB    2469374 A    10/2010
TW    201316214 A1    4/2013

*Primary Examiner* — Kumar Patel
*Assistant Examiner* — Amy C Onyekaba
(74) *Attorney, Agent, or Firm* — Fenwick & West LLP (57) ABSTRACT

Disclosed is a display device with an integrated touch screen. The display device includes a panel configured to operate in a display driving mode and a touch driving mode, the panel including a plurality of driving electrodes, a plurality of sensing electrodes, and a plurality of data lines including a plurality of first data lines and a plurality of second data lines; and a display driver integrated circuit (IC) configured to apply data voltages to the plurality of first data lines and the plurality of second data lines during the display driving mode of the panel, and the display driver IC configured to apply a ground voltage to the plurality of first data lines and float the plurality of second data lines during the touch driving mode of the panel.

16 Claims, 7 Drawing Sheets

(56) References Cited

U.S. PATENT DOCUMENTS

2013/0342478 A1* 12/2013 Bae .................. G06F 3/041
                                                                           345/173
2013/0342479 A1* 12/2013 Pyo .................. G09G 3/00
                                                                           345/173

\* cited by examiner

|  | First period | | Second period | |
|---|---|---|---|---|
|  | First driving area switch | Second driving area switch | First driving area switch | Second driving area switch |
| TUDL 1/2 | 1 | 0 | 0 | 1 |
| RUDL | 1 | 0 | 0 | 0 |

|  | First period | | | Second period | | |
|---|---|---|---|---|---|---|
|  | Unit driving area data line | First driving area switch | Second driving area switch | Unit sensing area data line | First driving area switch | Second driving area switch |
| TUDL 1/2 | p | 1 | 0 | p | 0 | 1 |
| RUDL | q | 1 | 0 | q | 0 | 0 |

FIG. 8

DISPLAY DEVICE WITH INTEGRATED TOUCH SCREEN AND DRIVING METHOD THEREOF

CROSS-REFERENCE TO RELATED APPLICATIONS

This application claims the benefit of the Korean Patent Application No. 10-2013-0169317 filed on Dec. 31, 2013, which is hereby incorporated by reference in its entirety.

BACKGROUND

Field of Technology

The embodiments herein relate to a display device, and more particularly, to a display device with an integrated in-cell type touch screen and a driving method thereof.

Discussion of the Related Art

Touch screens are a type of input device that is included in display devices such as liquid crystal display (LCD) devices, field emission displays (FEDs), plasma display panels (PDPs), electroluminescent displays (ELDs), and electrophoretic displays (EPDs), and enable a user to input information by directly touching a screen with a finger, a pen or the like while looking at the screen of the display device.

Particularly, the demand for display devices with integrated in-cell type touch screen, which include a plurality of built-in elements configuring the touch screen for slimming portable terminals such as smart phones and tablet personal computers (PCs), is recently increasing.

In a related art display device with integrated in-cell type touch screen disclosed in U.S. Pat. No. 7,859,521, a plurality of common electrodes for display are segmented into a plurality of touch driving areas and touch sensing areas, thereby allowing a mutual capacitance to be generated between the touch driving area and the touch sensing area. Therefore, the related art display device measures a mutual capacitance change that occurs in touch, and thus determines whether there is a touch.

In the display device with an integrated in-cell type touch screen, in order for each of a common electrode to perform a function of a touch electrode, when a panel operates in a touch driving mode, a driving pulse is applied to common electrodes corresponding to a touch driving area and whether there is a touch is determined by using a plurality of sensing signals from common electrodes corresponding to a touch sensing area.

Moreover, the common electrodes corresponding to the touch driving area and the common electrodes corresponding to the touch sensing area overlap a corresponding data line. When the panel operates in a display driving mode, a data voltage is applied to a data line, and when the panel operates in the touch sensing mode, voltages in the same state are respectively applied to data lines.

When the panel operates in the touch driving mode, since voltages in the same state are respectively applied to data lines, parasitic capacitance increases, or a voltage of a data line is affected by the driving pulse. For this reason, a mutual capacitance error occurs, causing a reduction in touch performance.

SUMMARY

Accordingly, the embodiments herein are directed to provide a display device with an integrated in-cell type touch screen and a driving method thereof that substantially obviates one or more problems due to limitations and disadvantages of the related art.

An aspect of the embodiments herein is directed to provide a display device with an integrated touch screen, in which data voltage states of a driving electrode area and a sensing electrode area are differently set, and thus, touch performance can be enhanced.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages, as embodied and broadly described herein, there is provided a display device with an integrated touch screen including: a panel configured to operate in a display driving mode and a touch driving mode, the panel including a plurality of driving electrodes, a plurality of sensing electrodes, and a plurality of data lines including a plurality of first data lines and a plurality of second data lines; and a display driver integrated circuit (IC) configured to apply data voltages to the plurality of first data lines and the plurality of second data lines during the display driving mode of the panel, and the display driver IC configured to apply a ground voltage to the plurality of first data lines and float the plurality of second data lines during the touch driving mode of the panel.

In another embodiment, there is provided a method of driving a display device with an integrated touch screen the display device including a panel configured to operate in a display driving mode and a touch driving mode, the panel including a plurality of driving electrodes, a plurality of sensing electrodes, and a plurality of data lines including a plurality of first data lines and a plurality of second data lines, the method comprising: applying data voltages to the plurality of first data lines and the plurality of second data lines during the display driving mode of the panel; and applying a ground voltage to the plurality of first data lines and floating the plurality of second data lines during the touch driving mode of the panel.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Hereinafter, the embodiments herein will be described in detail with reference to the accompanying drawings.

In this disclosure below, for convenience of a description, a display device with an integrated touch screen according to embodiments herein will be exemplarily described as being a LCD device, but the embodiments herein are not limited thereto. The embodiments herein may be applied to various display devices such as FEDs, PDPs, ELDs, and EPDs. Also, a description on the general configuration of an LCD device is not provided.

Figure 1:
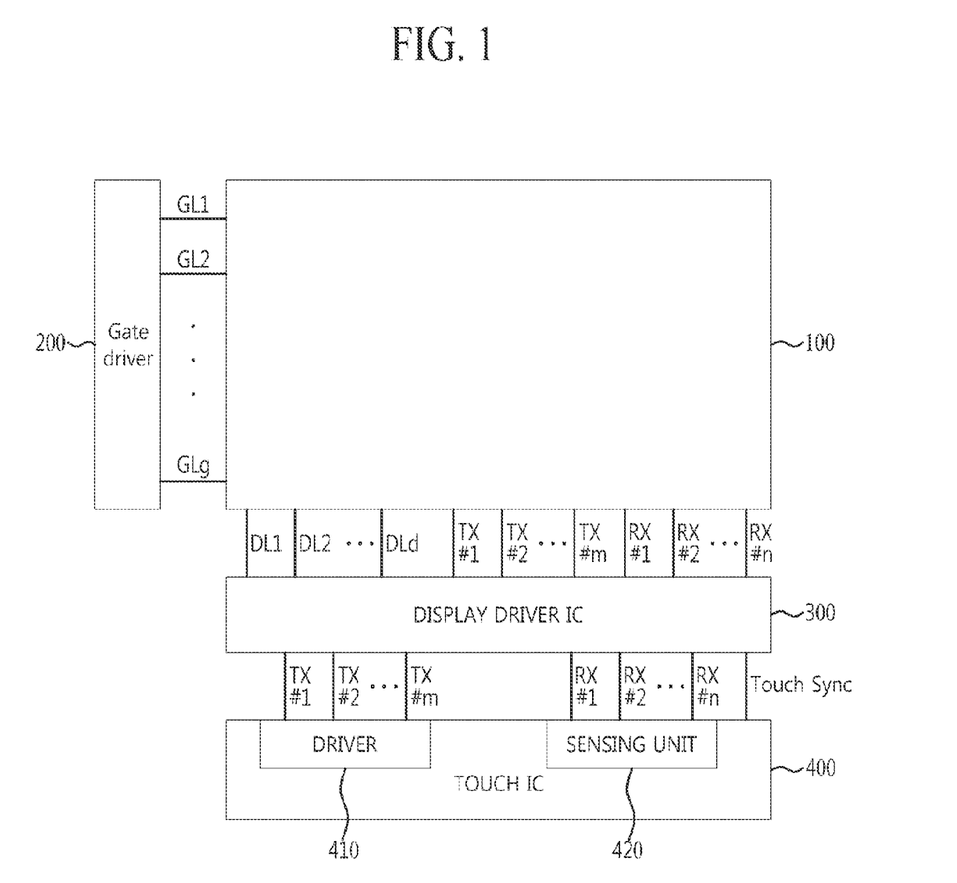
FIG. 1 is a diagram schematically illustrating a configuration of a display device with integrated touch screen according to one embodiment.
Figure 2:
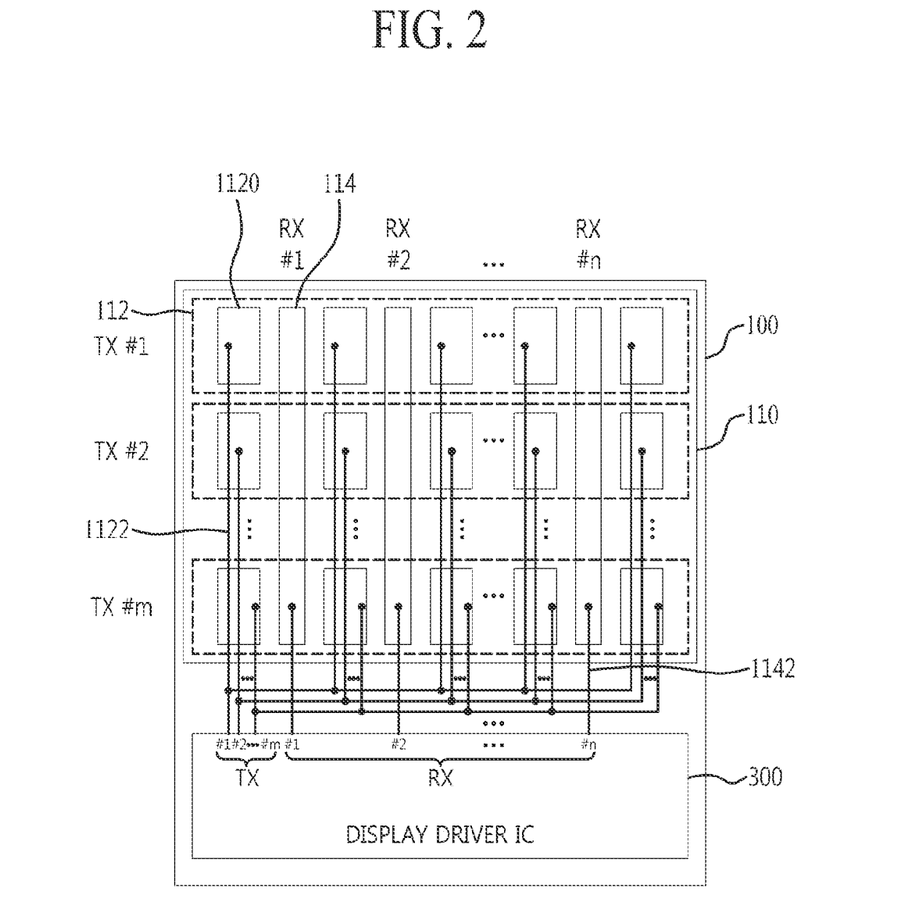
FIG. 2 is a diagram illustrating a detailed structure of a plurality of driving electrodes and a plurality of sensing electrodes built into a panel of FIG. 1 and a connection relationship with a display driver integrated circuit (IC) according to one embodiment.
Figure 3:
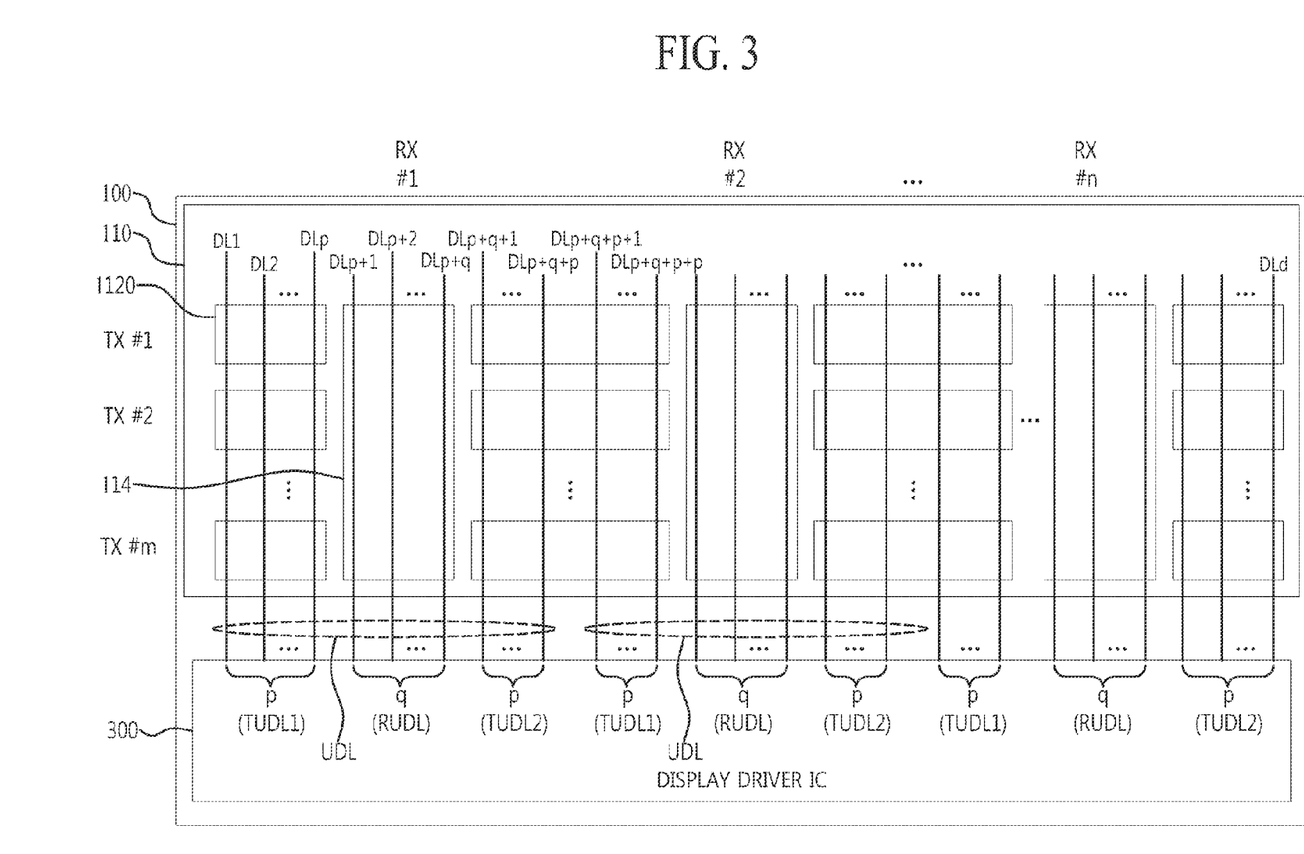
FIG. 3 is a diagram illustrating positions of data lines built into the panel of FIG. 1 and a connection relationship with the display driver IC according to one embodiment.

FIG. 1 is a diagram schematically illustrating a configuration of a display device with an integrated touch screen according to one embodiment. FIG. 2 is a diagram illustrating a detailed structure of a plurality of driving electrodes and a plurality of sensing electrodes built into a panel of FIG. 1 and a connection relationship with a display driver integrated circuit (IC). FIG. 3 is a diagram illustrating positions of data lines built into the panel of FIG. 1 and a connection relationship with the display driver IC.

As illustrated in FIG. 1, the display device with an integrated touch screen includes a panel 100, a gate driver 200, a display driver IC 300, and a touch IC 400.

The panel 100 includes a plurality of gate lines and a plurality of data lines, and includes a plurality of touch electrodes which overlap the plurality of gate lines and the plurality of data lines.

For example, as illustrated in FIG. 2, a touch screen 110 including the plurality of touch electrodes is built into the panel 100, and the touch screen 110 includes a plurality of driving electrodes 112 and a plurality of sensing electrodes 114 as the plurality of touch electrodes.

The respective driving electrodes 112 may be connected to the display driver IC 300 through a plurality of driving electrode lines 1122, and the respective sensing electrodes 114 may be connected to the display driver IC 300 through a plurality of sensing electrode lines 1142.

For example, when the display device with an integrated touch screen is driven in a display driving mode, the driving electrodes 112 and the sensing electrodes 114 may perform the function of a common electrode. However, when the display device with an integrated touch screen is driven in a touch driving mode, the driving electrodes 112 may perform the function of a touch driving electrode, and the sensing electrodes 114 may perform the function of a touch sensing electrode.

In other words, the driving electrodes and sensing electrodes of the display device with integrated touch screen according to embodiments herein may act as common electrodes, and moreover may perform a function of a touch electrode as well as a function of a display electrode.

In an embodiment, the driving electrodes 112 may be formed in parallel in a first direction (e.g., a width direction) that is the direction of a gate line (not shown) in the panel 100. That is, the driving electrodes 112 are formed in the first direction that is parallel to the direction of the gate lines. Each of the sensing electrodes 114 may be disposed between adjacent sub driving electrodes among a plurality of sub driving electrodes (not shown), and formed in parallel in a second direction (e.g., a height direction) that is the direction of a data line (not shown) in the panel 100. That is, the sensing electrodes 112 are formed in the second direction that is parallel to the direction of the data lines which is substantially perpendicular to the first direction.

For example, as illustrated in FIG. 2, the driving electrodes 112 may include first to mth driving electrodes TX#1 to TX#m, and each of the driving electrodes 112 may include n+1 number of sub driving electrodes 1120. Also, the sensing electrodes 114 may include first to nth sensing electrodes RX#1 to RX#n. In order to configure one driving electrode, the sub driving electrodes 1120 may be electrically connected to each other by a plurality of driving electrode lines 1112 in a non-display area A of the panel 100 which is formed outside the display driver IC 300, respectively. Alternatively, although not shown, the sub driving electrodes 1120 may be electrically connected to each other in the display driver IC 300, or may be electrically connected to each other through respective connection lines in a display area of the panel 100.

Each of the driving electrodes 112 may be formed as a plurality of block-form common electrodes that are formed to be overlapped with a plurality of unit pixel areas, and each of the sensing electrodes 114 may be formed as one block-form common electrode that is formed to be overlapped with the unit pixel areas.

The driving electrodes 112 and the sensing electrodes 114 act as a common electrode for driving liquid crystal, and thus may be formed of a transparent material such as indium tin oxide (ITO).

When the panel 100 operates in a display driving mode, the gate driver 200 sequentially applies a gate-on voltage to a plurality of gate lines GL1 to GLg to turn on a plurality of switching transistors respectively connected to the plurality of gate lines GL1 to GLg. Here, the gate driver 200 may be provided in the display driver IC 300, or may be provided separately from the display driver IC 300. For example, the gate driver 200 may be provided in a gate-in panel (GIP) type.

During a first period in which the panel 100 operates in the display driving mode, the display driver IC 300 respectively applies data voltages to a plurality of data lines DL1 to DLd. During a second period in which the panel 100 operates in a touch driving mode, the display driver IC 300 applies a ground voltage to a plurality of driving area data lines overlapping a plurality of driving electrodes among the plurality of data lines DL1 to DLd, and floats a plurality of sensing area data lines overlapping a plurality of sensing electrodes among the plurality of data lines DL1 to DLd.

Here, as illustrated in FIG. 3, the plurality of data lines may include a plurality of unit data lines UDL which are repeatedly arranged, and each of the plurality of unit data lines UDL may include p number of first driving area data lines TUDL1, q number of sensing area data lines RUDL, and p number of second driving area data lines TUDL2, which are sequentially arranged.

For example, the display driver IC 300 may respectively apply the data voltages to the plurality of data lines DL1 to DLd during the first period in which the panel 100 operates in the display driving mode, and during the second period in which the panel 100 operates in the touch driving mode, the display driver IC 300 may apply the ground voltage to the first and second driving area data lines TUDL1 and TUDL2 of each of the plurality of unit data lines UDL, and may float the sensing area data lines RUDL.

Therefore, the display device with integrated touch screen according to embodiments herein removes an influence of a driving pulse by applying the ground voltage to the driving area data lines overlapping the driving electrodes during the second period in which the panel operates in the touch driving mode, and decreases a parasitic capacitance between the sensing area data line and the sensing electrode by floating the sensing area data line overlapping the sensing electrode. Accordingly, a parasitic capacitance of the touch electrode is reduced in sensing a touch, thereby enhancing touch sensing performance.

In other words, states of data lines respectively corresponding to the driving electrode area and the sensing electrode area are separately set, and thus, a parasitic capacitance caused by the data line are decreased.

The display driver IC 300 generates a common voltage Vcom to apply the common voltage to the plurality of driving electrodes 112 and the plurality of sensing electrodes 114 during the first period in which the panel 100 operates in the display driving mode.

During the second period in which the panel 100 operates in the touch driving mode, the panel 100 generates the driving pulse according to a timing pulse to apply the driving pulse to the plurality of driving electrodes 112, and receives a plurality of sensing signals from the plurality of sensing electrodes 114 to transfer the sensing signals to the touch IC 400.

For example, the display driver IC 300 may apply the driving pulse to a plurality of driving electrodes TX#1 to TX#m during the second period in which the panel 100 operates in the touch driving mode.

In other words, in order for the plurality of driving electrodes and the plurality of sensing electrodes to perform a function of the common electrode and a function of the touch electrode, the display driver IC 300 divides a time, applies the common voltage during the first period, applies the driving pulse to the plurality of driving electrodes during the second period, and receives the sensing signals from the plurality of sensing electrodes.

For example, the display driver IC 300 may generate the driving pulse by using the timing pulse generated by the touch IC 400 to apply the generated driving pulse to the plurality of driving electrodes, or may receive the driving pulse directly generated by the touch IC 400 to apply the received driving pulse to the plurality of driving electrodes 112. Here, the timing pulse includes only timing information of the driving pulse, and the display driver IC 300 may generate a driving pulse having the maximum voltage VTX_HIGH and the minimum voltage VTX_LOW by using the timing pulse including the timing information of the driving pulse.

Hereinafter, an operation of the display driver IC will be described in detail with reference to FIGS. 4 to 6.

Figure 4:
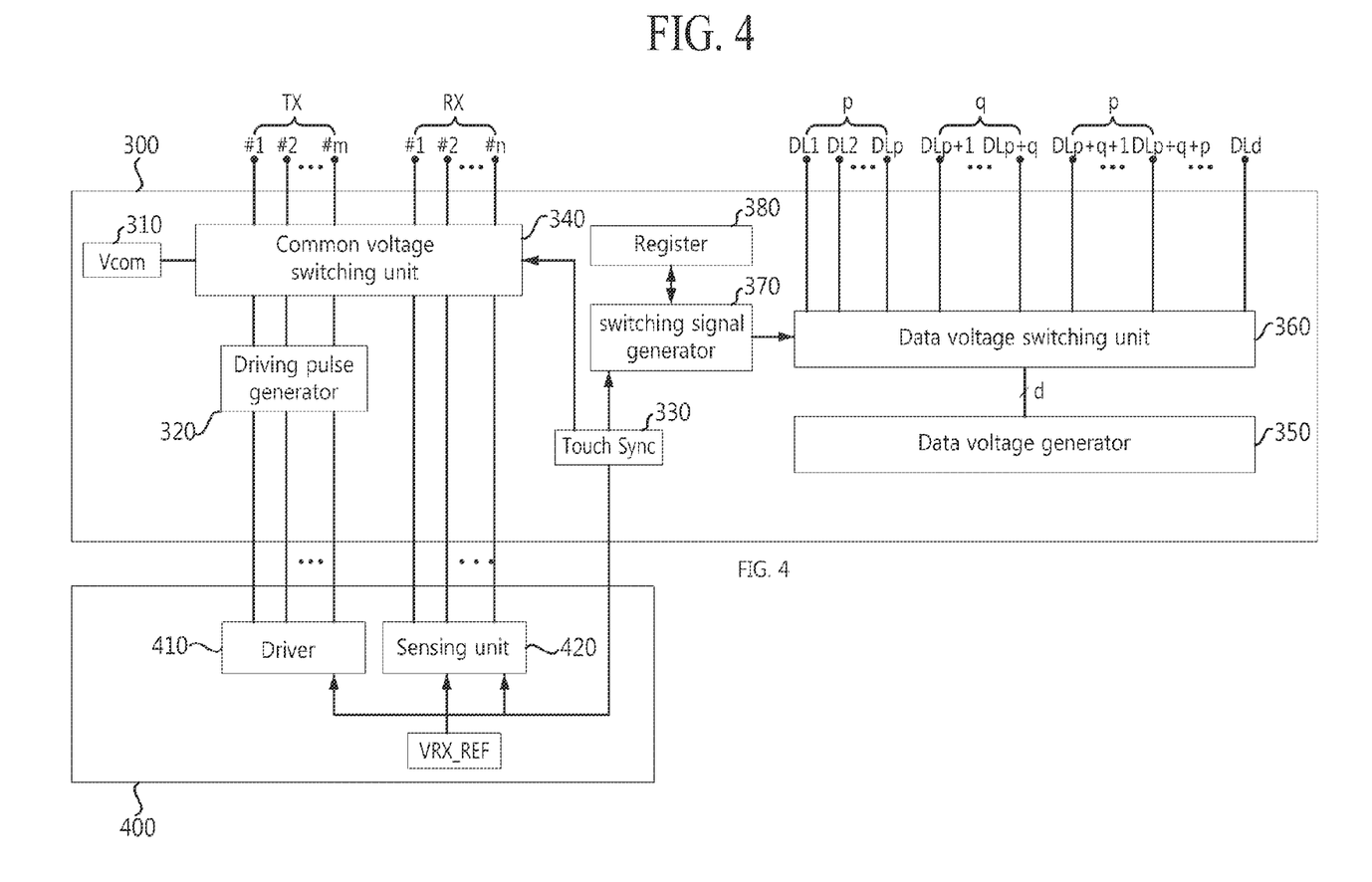
FIG. 4 is a diagram illustrating configurations of the display driver IC and the touch IC illustrated in FIGS. 1 to 3 according to one embodiment.

FIG. 4 is a diagram illustrating configurations of the display driver IC 300 and the touch IC 400 illustrated in FIGS. 1 to 3. FIG. 5 is a diagram illustrating a configuration of a voltage switching unit of FIG. 4. FIGS. 6 and 7 are diagrams illustrating examples of information stored in a register of FIGS. 4 and 5.

The display driver IC 300, as illustrated in FIG. 4, may include a common voltage generator 310, a driving pulse generator 320, a sync signal generator 330, a common voltage switching unit 340, a data voltage generator 350, a data voltage switching unit 360, a switching signal generator 370, and a register 380.

The common voltage generator 310 generates the common voltage Vcom for driving liquid crystal, and outputs the common voltage to the common voltage switching unit 340.

The driving pulse generator 320 generates a touch pulse by using the timing pulse generated by a driver 410 of the touch IC 400.

For example, the driving pulse generator 320 may be a level shifter that shifts a voltage. The driving pulse generator 320 may generate the touch pulse having the maximum voltage VTX_HIGH and the minimum voltage VTX_LOW according to timing information of the timing pulse generated by the touch IC 400.

The sync signal generator 330 generates a sync signal indicating a period based on a driving mode of the panel 100. Here, the sync signal may include a first sync signal, indicating a first period corresponding to the display driving mode, and a second sync signal indicating a second period corresponding to the touch driving mode.

For example, during the first period in which the panel 100 operates in the display driving mode, the sync signal generator 330 generates the first sync signal indicating the first period, and outputs the first sync signal to the common voltage switching unit 340, the touch IC 400, and the switching signal generator 370. During the second period in which the panel 100 operates in the touch driving mode, the sync signal generator 330 generates the second sync signal indicating the second period, and outputs the second sync signal to the common voltage switching unit 340, the touch IC 400, and the switching signal generator 370.

When the first sync signal is input, the common voltage switching unit 340 connects the common voltage generator 310 to the plurality of driving electrodes and the plurality of sensing electrodes, and thus, the common voltage Vcom is applied to the plurality of driving electrodes and the plurality of sensing electrodes.

When the second sync signal is input, the common voltage switching unit 340 connects the driving pulse generator 320 to the plurality of driving electrodes, and connects the sensing unit 420 of the touch IC 400 to the plurality of sensing electrodes. Thus, the driving pulse is applied to the plurality of driving electrodes, and a plurality of sensing signals are respectively received from the plurality of sensing electrodes.

The data voltage generator 350 generates and outputs data voltages.

For example, the data voltage generator 350 may be a source driver, and may generate and output the data voltages according to a control signal, in the display driver IC 300.

The data voltage switching unit 360 includes a switching unit that connects the data generator 350 to the plurality of data lines DL1 to DLd, and transfers the ground voltage to the plurality of data lines.

Figure 5:
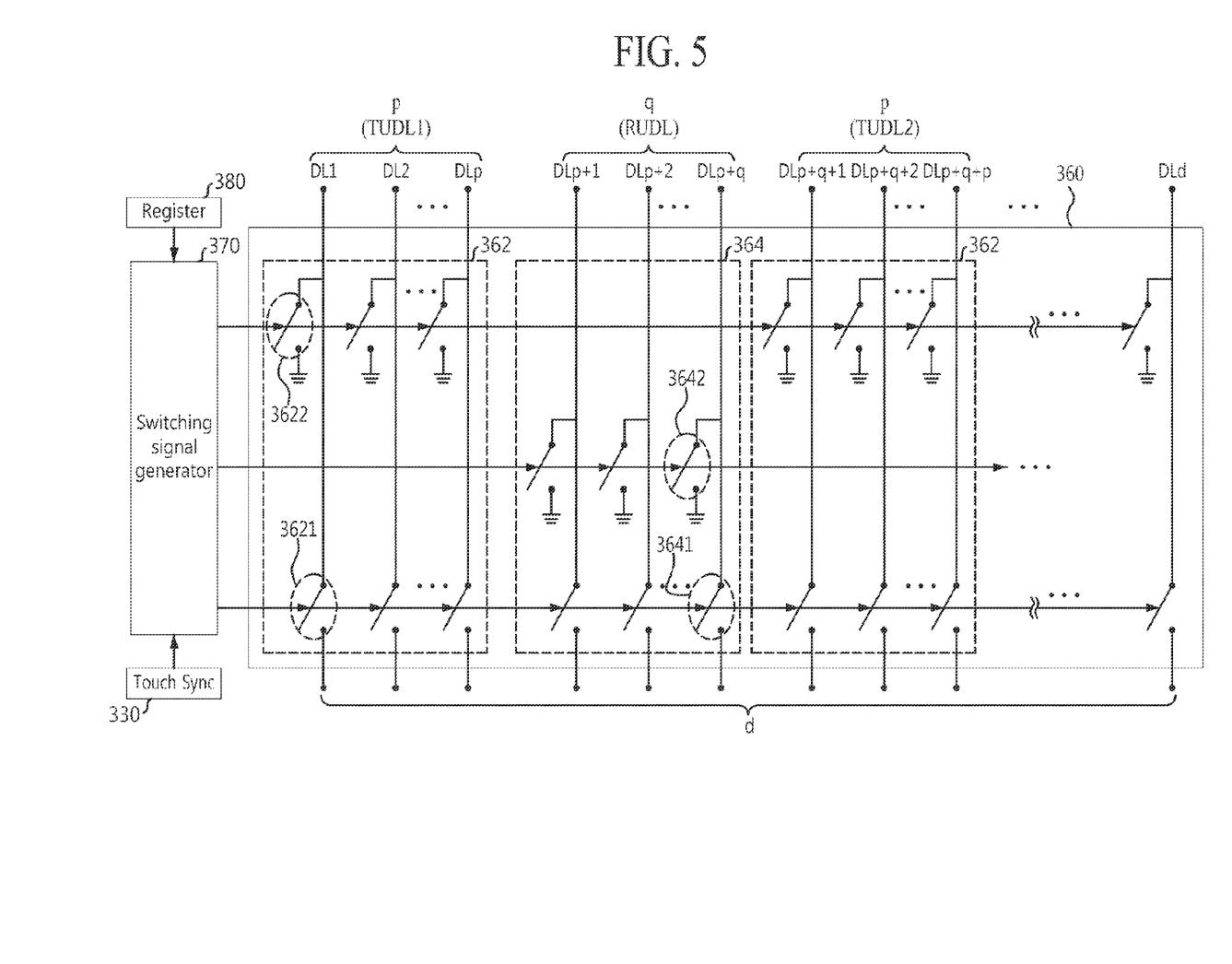
FIG. 5 is a diagram illustrating a configuration of a voltage switching unit of FIG. 4 according to one embodiment.

For example, as illustrated in FIG. 5, the data voltage switching unit 360 may include a driving area switching unit 362 connected to a driving area data line and a sensing area switching unit 364 connected to a sensing area data line.

The driving area switching unit 362 may include a plurality of first driving area switches 3621, which connect the data voltage generator 350 to the plurality of driving area data lines, and a plurality of second driving area switches 3622 that supply the ground voltage to the plurality of driving area data lines.

In detail, during the first period, the plurality of first driving area switches 3621 of the driving area switching unit 362 are turned on according to a first switching signal generated by the switching signal generator 370 to connect the data voltage generator 350 to the driving area data lines, and the plurality of second driving area switches 3622 are turned off according to a second switching signal generated by the switching signal generator 370 to cut off the supply of the ground voltage to the driving area data lines.

Moreover, during the second period, the plurality of first driving area switches 3621 of the driving area switching unit 362 are turned off according to the second switching signal generated by the switching signal generator 370 to disconnect the data voltage generator 350 from the driving area data lines, and the plurality of second driving area switches 3622 are turned on according to the first switching signal generated by the switching signal generator 370 to supply the ground voltage to the driving area data lines.

For example, when the plurality of first driving area switches 3621 and the plurality of second driving area switches 3622 are N-type switches, the first switching signal may a high-level voltage that turns on the plurality of first driving area switches 3621 and the plurality of second driving area switches 3622, and the second switching signal may a low-level voltage that turns off the plurality of first driving area switches 3621 and the plurality of second driving area switches 3622.

The sensing area switching unit 364 may include a plurality of first sensing area switches 3641, which connect the data voltage generator 350 to the plurality of sensing area data lines, and a plurality of second sensing area switches 3642 that supply the ground voltage to the plurality of sensing area data lines.

In detail, during the first period, the plurality of first sensing area switches 3641 of the sensing area switching unit 364 are turned on according to the first switching signal generated by the switching signal generator 370 to connect the data voltage generator 350 to the sensing area data lines, and the plurality of second sensing area switches 3642 are turned off according to the second switching signal generated by the switching signal generator 370 to cut off the supply of the ground voltage to the sensing area data lines.

Moreover, during the second period, the plurality of first sensing area switches 3641 of the sensing area switching unit 364 are turned off according to the second switching signal generated by the switching signal generator 370 to disconnect the data voltage generator 350 from the sensing area data lines, and the plurality of second sensing area switches 3642 are turned off according to the second switching signal generated by the switching signal generator 370 to cut off the supply of the ground voltage to the sensing area data lines, thereby floating the sensing area data lines. Thus, the plurality of second sensing area switches 3642 are turned off during the first period and the second period.

For example, when the plurality of first sensing area switches 3641 and the plurality of second sensing area switches 3642 are N-type MOSFETs, the first switching signal may a high-level voltage that turns on the plurality of first sensing area switches 3641 and the plurality of second sensing area switches 3642, and the second switching signal may a low-level voltage that turns off the plurality of first sensing area switches 3641 and the plurality of second sensing area switches 3642.

Therefore, in the display device with integrated touch screen according to embodiments herein, during the second period in which the panel 100 operates in the touch driving mode, the ground voltage may be applied to the data lines in the driving electrode area, and the data lines in the sensing electrode area may be floated.

The switching signal generator 370 generates the first switching signal by using a first control signal stored in the register 380, and outputs the first switching signal to the plurality of first driving area switches 3621 of the driving area switching unit 362 and the plurality of first sensing area switches 3641 of the sensing area switching unit 364, according to the first sync signal generated by the sync signal generator 330. Also, the switching signal generator 370 generates the second switching signal by using a second control signal stored in the register 380, and outputs the second switching signal to the plurality of second driving area switches 3622 of the driving area switching unit 362 and the plurality of second sensing area switches 3642 of the sensing area switching unit 364.

For example, when it is assumed that the plurality of first and second driving area switches and the plurality of first and second sensing area switches are N-type switches, while the panel 100 is operating in the display driving mode according to the first sync signal generated by the sync signal generator 330, the switching signal generator 370 generates the first switching signal having a high-level voltage for turning on the plurality of first driving area switches 3621 and the plurality of first sensing area switches 3641 by using the first control signal stored in the register 380, and generates the second switching signal having a low-level voltage for turning off the plurality of second driving area switches 3622 and the plurality of second sensing area switches 3642 by using the second control signal stored in the register 380.

Moreover, the switching signal generator 370 generates the second switching signal by using the second control signal stored in the register 380 and outputs the second switching signal to the plurality of first driving area switches 3621 and the plurality of first sensing area switches 3641, according to the second sync signal generated by the sync signal generator 330. Also, the switching signal generator 370 generates the first switching signal by using the first control signal stored in the register 380 to output the first switching signal to the plurality of second driving area switches 3622, and generates the second switching signal by using the second control signal stored in the register 380 to output the second switching signal to the plurality of second sensing area switches 3642.

For example, when it is assumed that the plurality of first and second driving area switches and the plurality of first and second sensing area switches are N-type switches, while the panel 100 is operating in the display driving mode according to the first sync signal generated by the sync signal generator 330, the switching signal generator 370 generates the first switching signal having a high-level voltage for turning on the plurality of first driving area switches 3621 and the plurality of first sensing area switches 3641 by using the first control signal stored in the register 380, and generates the second switching signal having a low-level voltage for turning off the plurality of second driving area switches 3622 and the plurality of second sensing area switches 3642 by using the second control signal stored in the register 380.

During the first period, the register 380 stores the first control signal corresponding to the first switching signal output to the plurality of first driving area switches 3621 of the driving area switching unit 362, and stores the second control signal corresponding to the second switching signal output to the plurality of second driving area switches 3622.

Figure 6:
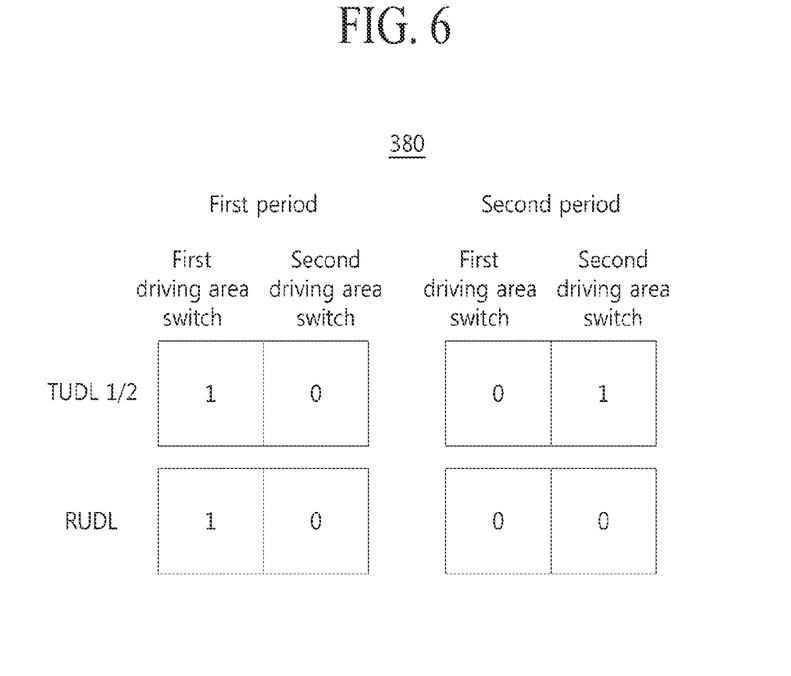
FIGS. 6 and 7 are diagrams illustrating examples of information stored in a register of FIGS. 4 and 5.
Figure 7:
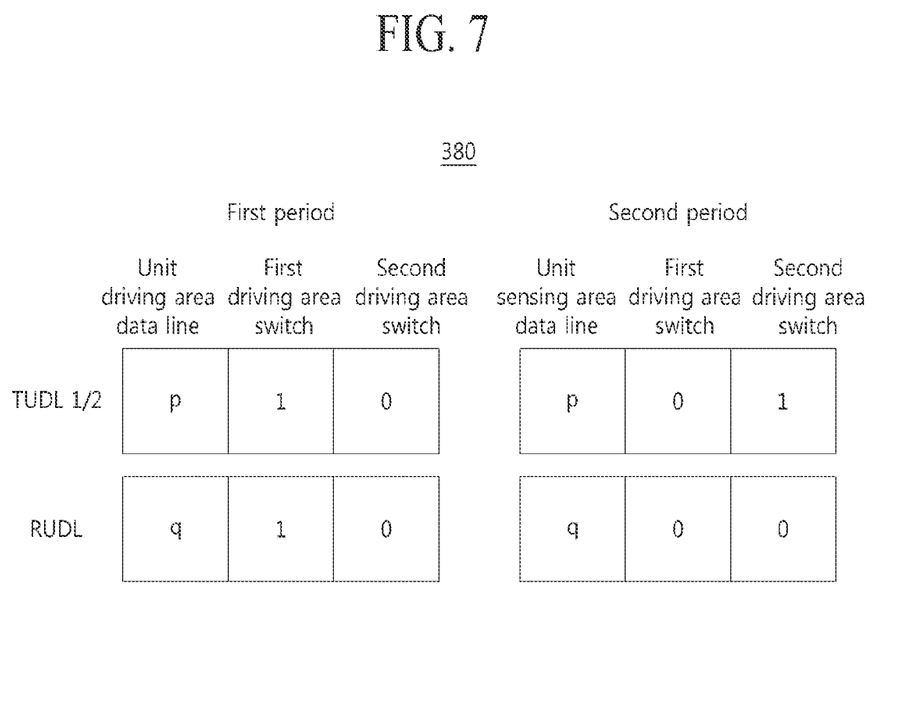

For example, as illustrated in FIG. 6, when it is assumed that the first switching signal applied to the plurality of first driving area switches 3621 connected to the first and second driving area data lines TUDL1/2 during the first period has a high-level voltage (e.g., 1) that is the first control signal corresponding thereto is stored, and when it is assumed that the second switching signal applied to the plurality of second driving area switches 3622 has a low-level voltage (e.g., 0) that is the second control signal corresponding thereto is stored.

Moreover, during the first period, the register 380 stores the first control signal corresponding to the first switching signal output to the plurality of first sensing area switches 3641 of the sensing area switching unit 364, and stores the second control signal corresponding to the second switching signal output to the plurality of second sensing area switches 3642.

For example, as illustrated in FIG. 6, when it is assumed that the first switching signal applied to the plurality of first sensing area switches 3641 connected to the sensing area data lines RUDL during the first period has a high-level voltage, the high-level voltage (e.g., 1) that is the first control signal corresponding thereto is stored, and when it is assumed that the second switching signal applied to the plurality of second sensing area switches 3642 has a low-level voltage (e.g., 0) that is the second control signal corresponding thereto is stored.

During the second period, the register 380 stores the second control signal corresponding to the second switching signal output to the plurality of first driving area switches 3621 of the driving area switching unit 362, and stores the first control signal corresponding to the first switching signal output to the plurality of second driving area switches 3622.

For example, as illustrated in FIG. 6, when it is assumed that the second switching signal applied to the plurality of first driving area switches 3621 connected to the first and second driving area data lines TUDL1/2 during the second period has a low-level voltage (e.g., 0) that is the second control signal corresponding thereto is stored, and when it is assumed that the first switching signal applied to the plurality of second driving area switches 3622 has a high-level voltage (e.g., 1) that is the first control signal corresponding thereto is stored.

Moreover, during the second period, the register 380 stores the second control signal corresponding to the second switching signal output to the plurality of first sensing area switches 3641 of the sensing area switching unit 364, and stores the second control signal corresponding to the second switching signal output to the plurality of second sensing area switches 3642.

For example, as illustrated in FIG. 6, when it is assumed that the second switching signal applied to the plurality of first sensing area switches 3641 connected to the sensing area data lines RUDL during the second period has a low-level voltage (e.g., 0) that is the second control signal corresponding thereto is stored, and when it is assumed that the second switching signal applied to the plurality of second sensing area switches 3642 has a low-level voltage (e.g., 0) that is the second control signal corresponding thereto is stored.

In other words, when arrangement of the data lines included in the panel 100 of the display device with integrated touch screen according to embodiments herein is fixed, as illustrated in FIG. 6, only a control signal corresponding to a switch (connected to a driving area data line) and a switch connected to a sensing area data line may be stored in the register 380.

On the other hand, sizes of a driving electrode and a sensing electrode may be changed by changing a design of the panel, and thus, a setting of a switching signal applied to a switch connected to a driving area data line and a sensing area data line is needed. Therefore, the register may store the number of first or second driving area data lines among the plurality of unit data lines and a control signal corresponding to a switching signal output to the first and second driving area switches, and may also store the number of sensing area data lines among the plurality of unit data lines and a control signal corresponding to a switching signal output to the first and second sensing area switches.

For example, as illustrated in FIG. 7, when it is assumed that p which is the number of first or second driving area data lines TUDL1/2 among the plurality of unit data lines UDL is stored in the register and the first switching signal applied to the plurality of first driving area switches 3621 connected to the first and second driving area data lines TUDL1/2 during the first period has a high-level voltage (e.g., 1) that is the first control signal corresponding thereto may be stored, and when it is assumed that the second switching signal applied to the plurality of second driving area switches 3622 has a low-level voltage (e.g., 0) that is the second control signal corresponding thereto may be stored.

Moreover, as illustrated in FIG. 7, when it is assumed that q which is the number of sensing area data lines RUDL among the plurality of unit data lines UDL is stored in the register and the first switching signal applied to the plurality of first sensing area switches 3641 connected to the sensing area data lines RUDL during the first period has a high-level voltage (e.g., 1) that is the first control signal corresponding thereto may be stored, and when it is assumed that the second switching signal applied to the plurality of second sensing area switches 3642 has a low-level voltage (e.g., 0) that is the second control signal corresponding thereto may be stored.

Moreover, as illustrated in FIG. 7, when it is assumed that p that is the number of first or second driving area data lines TUDL1/2 among the plurality of unit data lines UDL is stored in the register and the second switching signal applied to the plurality of first driving area switches 3621 connected to the first and second driving area data lines TUDL1/2 during the second period has a low-level voltage (e.g., 0) that is the second control signal corresponding thereto may be stored, and when it is assumed that the first switching signal applied to the plurality of second driving area switches 3622 has a high-level voltage (e.g., 1) that is the first control signal corresponding thereto may be stored.

Moreover, as illustrated in FIG. 7, when it is assumed that q which is the number of sensing area data lines RUDL among the plurality of unit data lines UDL is stored in the register and the second switching signal applied to the plurality of first sensing area switches 3641 connected to the sensing area data lines RUDL during the second period has a low-level voltage (e.g., 0) that is the second control signal corresponding thereto may be stored, and when it is assumed that the second switching signal applied to the plurality of second sensing area switches 3642 has a low-level voltage (e.g., 0) that is the second control signal corresponding thereto may be stored.

Furthermore, p that is the number of the first or second driving area data lines and stored in the register 380 of FIG. 7 may be changed through a previous setting, or q that is the number of the sensing area data lines and stored in the register 380 of FIG. 7 may be changed through a previous setting. Thus, p and q are adjustable.

Therefore, in the display device with integrated touch screen according to embodiments herein, a state of a voltage applied to the driving area data line and the sensing area data line may be changed by changing a design of the panel 100.

In FIG. 4, the data voltage switching unit 360 and the data voltage generator 350 are illustrated as being separately provided. However, in another embodiment, a data voltage supply unit in which a function of the data voltage switching unit is integrated with a function of the data voltage generator may be included in the display driver IC.

For example, the data voltage supply unit may respectively output data voltages to the plurality of data lines according to the first control signal during the first period in which the panel operates in the display driving mode, output the ground voltage to the driving area data line according to the second control signal during the second period, and float the sensing area data line according to the third control signal during the second period.

The touch IC 400, as illustrated in FIG. 4, includes the driver 410 and the sensing unit 420.

The driver 410 generates the timing pulse to apply the timing pulse to the display driver IC 300, and the sensing unit 420 receives the sensing signals from the display driver IC 300 to determine whether there is a touch.

For example, the driver 410 may generate the timing pulse including only the timing information of the driving pulse to apply the timing pulse to the display driver IC 300. In this case, as described above, the display driver IC 300 may generate the touch pulse having the maximum voltage VTX_HIGH and the minimum voltage VTX_LOW by using the timing pulse.

A touch sensing reference voltage VRX_REF may be applied to the sensing unit 420, and may be substantially applied to the sensing electrode by an operational amplifier included in the sensing unit 420.

The sync signal, generated by the synch signal generator 330 of the display driver IC 300, is applied to the driver 410 and the sensing unit 420. The driver 410 and the sensing unit 420 operate according to the sync signal generated by the synch signal generator 330.

For example, when the second synch signal indicating the second period is input, the driver 410 may generate the timing pulse to output the timing pulse to the driving pulse generator 320 of the display driver IC 300, and the sensing unit 420 may receive the sensing signals from the display driver IC 300 to determine whether there is a touch.

The sensing unit 420 may include an operational amplifier (not shown) and an analog-to-digital converter (ACD, not shown), which correspond to each of the plurality of sensing electrodes 114.

For example, the operational amplifier (not shown) may include a non-inverting input terminal receiving the touch sensing reference voltage VRX_REF, an inverting input terminal connected to one of the plurality of sensing electrodes 114, and an output terminal connected to the ADC (not shown).

In detail, when the touch sensing reference voltage VRX_REF is applied to the non-inverting input terminal of the operational amplifier (not shown), the inverting input terminal and the non-inverting input terminal need to form a virtual ground in operating characteristic of the operational amplifier, and thus, the touch sensing reference voltage VRX_REF is substantially applied to the sensing electrodes 114.

Furthermore, although the driving electrode 112 is not electrically connected to the sensing electrode 114, a mutual capacitance ($C_M$) between the driving electrode 112 and the sensing electrode 114 is changed by the driving pulse applied to the driving electrode 112. The operational amplifier (not shown) may integrate the mutual capacitance change to output the integrated result as a voltage to the ADC (not shown), or transfer the mutual capacitance change as a voltage to the ADC (not shown).

The ADC (not shown) converts a voltage, output from the operational amplifier, into a digital code. Also, the sensing unit 420 may include a touch analyzer (not shown) that analyzes the mutual capacitance change output from the ADC (not shown) to determine whether there is a touch.

Therefore, the touch IC 400 may determine whether there is a touch, based on a voltage change caused by a capacitance change between the driving electrode and the sensing electrode with respect to the touch sensing reference voltage VRX_REF.

Hereinafter, a method of driving the display device with integrated touch screen according to embodiments of the present invention will be described with reference to FIG. 8.

Figure 8:
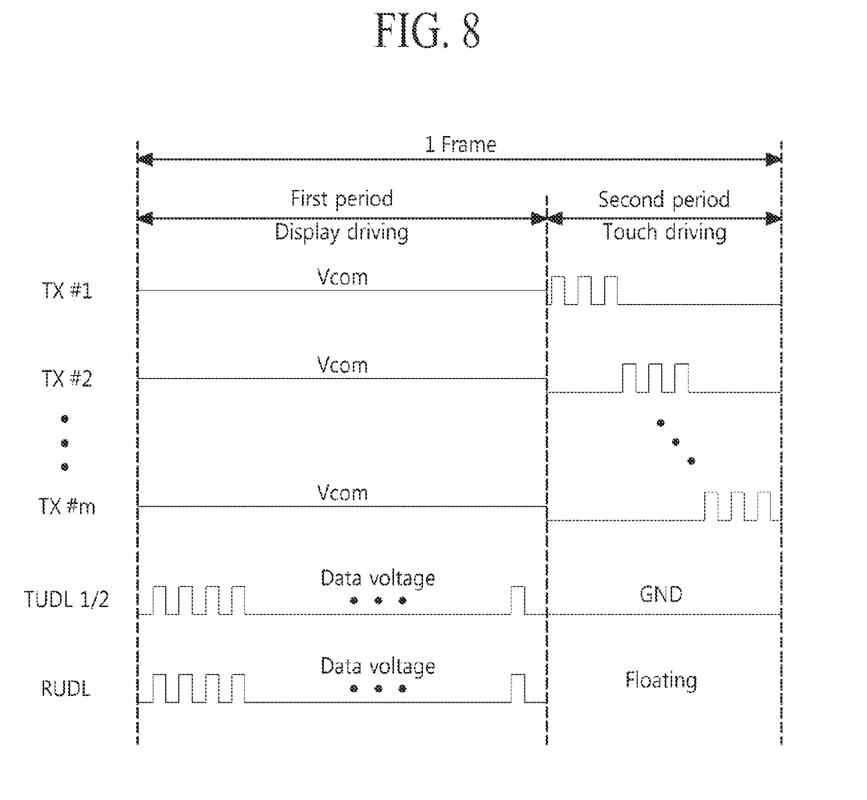
FIG. 8 is a timing chart for describing a method of driving the display device with integrated touch screen illustrated in FIG. 1 according to one embodiment.

FIG. 8 is a timing chart for describing a method of driving the display device with integrated touch screen illustrated in FIG. 1.

As shown in FIG. 8, in each frame, the display device with integrated touch screen according to embodiments herein may operate in the first period, in which the panel operates in the display driving mode, and the second period in which the panel operates in the touch driving mode.

First, during the first period in which the panel operates in the display driving mode, data voltages are respectively applied to the plurality of data lines.

Moreover, during the first period, the common voltage may be applied to the plurality of driving electrodes TX#1 to TX#m and the plurality of sensing electrodes.

Subsequently, during the second period in which the panel operates in the touch driving mode, the ground voltage is applied to the driving area data lines TUDL1/2 overlapping the plurality of driving electrodes among the plurality of data lines, and the sensing area data lines RUDL overlapping the plurality of sensing electrodes are floated.

Moreover, during the second period, the driving pulse may be applied to the plurality of driving electrodes TX#1 to TX#m, and the sensing signals may be respectively received from the plurality of sensing electrodes.

According to the embodiments herein, states of data voltages which are respectively applied to a driving area data line and a sensing area data line in the touch driving mode are differently set, and thus, a parasitic capacitance is reduced, thereby enhancing touch sensing performance.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device with an integrated touch screen, the display device comprising:
   a panel configured to operate in a display driving mode and a touch driving mode, the panel including a plurality of driving electrodes, a plurality of sensing electrodes, and a plurality of data lines including a plurality of first data lines and a plurality of second data lines; and a display driver integrated circuit (IC) configured to apply data voltages to the plurality of first data lines and the plurality of second data lines during the display driving mode of the panel, and the display driver IC configured to apply a ground voltage to the plurality of first data lines during the touch driving mode of the panel and float the plurality of second data lines during the touch driving mode of the panel.

2. The display device of claim 1, wherein the plurality of first data lines overlap at least a part of the plurality of driving electrodes and wherein the plurality of second data lines overlap at least a part of the plurality of sensing electrodes.

3. The display device of claim 1, wherein the display driver IC comprises:
   a data voltage generator configured to generate the data voltages; and
   a data voltage switching circuit configured to connect the plurality of data lines to either the data voltages generated by the data voltage generator during the display driving mode of the panel or connect the plurality of first data lines to the ground voltage during the touch driving mode and float the plurality of second data lines during the touch driving mode.

4. The display device of claim 3, wherein the data voltage switching circuit comprises:
   a driving area switching unit connected to the plurality of first data lines, the driving area switching unit including a plurality of first driving switches and a plurality of second driving switches, the plurality of first driving switches configured to connect the data voltage generator to the plurality of first data lines during the display driving mode, and the plurality of second driving switches configured to connect the plurality of first data lines to ground during the touch driving mode of the panel; and
   a sensing area switching unit connected to the plurality of second data lines, the second area switching unit including a plurality of first sensing switches and a plurality of second sensing switches, the plurality of first sensing switches configured to connect the data voltage generator to the plurality of second data lines during display driving mode, and the plurality of second sensing switches configured to disconnect the plurality of second data lines from the ground voltage during the touch driving mode to float the plurality of second data lines, wherein the plurality of first sensing switches are disconnected from the data voltage generator during the touch driving mode.

5. The display device of claim 4, wherein the plurality of first driving switches are turned on during the display driving mode according to a first switching signal to connect the data voltage generator to the plurality of first data lines, and the plurality of second driving switches are turned off according to a second switching signal to disconnect the plurality of first data lines from the ground voltage, and
   the plurality of first driving switches are turned off during the touch driving mode according to the second switching signal to disconnect the data voltage generator from the plurality of first data lines, and the plurality of second driving switches are turned on according to the first switching signal to connect the plurality of first data lines to the ground voltage, and
   the plurality of first sensing switches are turned on during the display driving mode according to the first switching signal to connect the data voltage generator to the plurality of second data lines, and the plurality of second sensing switches are turned off according to the second switching signal to disconnect the plurality of second data lines from the ground voltage, and
   the plurality of first sensing switches are turned off during the touch driving mode according to the second switching signal to disconnect the data voltage generator from the plurality of second data lines, and the plurality of second sensing switches are turned off according to the second switching signal to disconnect the plurality of second data lines from the ground voltage to float the plurality of second data lines.

6. The display device of claim 5, wherein the display driver IC further comprises:
   a sync signal generator configured to generate a first sync signal and a second sync signal, the first sync signal indicating the display driving mode of the panel and the second sync signal indicating the second period of the panel; and
   a switching signal generator configured to generate the first switching signal based on a first control signal and output the first switching signal to the plurality of first driving switches of the driving area switching unit and the plurality of first sensing switches of the sensing area switching unit responsive to the first sync signal, and the switching signal generator configured to generate the second switching signal based on a second control signal and output the second switching signal to the plurality of second driving switches of the driving area switching unit and the plurality of second sensing switches of the sensing area switching unit responsive to the first sync signal; and
   the switching signal generator configured to generate the second switching signal based on the second control signal and output the second switching signal to the plurality of first driving switches and the plurality of first sensing switches responsive to the second sync signal, and the generate the first switching signal based on the first control signal and output the first switching signal to the plurality of second driving switches responsive to the second sync signal, and generate the second switching signal based on the second control signal and output the second switching signal to the plurality of second sensing switches responsive to the second sync signal.

7. The display device of claim 6, further comprising:
   a register configured to store the first control signal during the display driving period and store the second control signal during the touch driving period.

8. The display device of claim 6, wherein the plurality of data lines include a unit data line including p number of first data lines of a first subset of the first data lines, q number of the second data lines, and p number of first data lines of a second subset of the first data lines which are sequentially arranged.

9. The display device of claim 8, wherein the p number of first data lines of the first subset of the first data lines, the p number of first data lines of the second subset of the first data lines p, and the q number of second data lines are adjustable.

10. The display device of claim 8, wherein the data voltage switching circuit comprises for each of a plurality of unit data lines:
   a driving area switching unit connected to the p number of first data lines of the first subset of the first data lines and the p number of first data lines of the second subset of the first data lines; and
   a sensing area switching unit connected to the q number of second data lines.

11. The display device of claim 1, wherein the display driver IC comprises:
a data voltage supply unit configured to output the data voltages to the plurality of data lines during the display driving mode of the panel, and output the ground voltage to the first plurality of data lines during the touch driving mode of the panel, and float the plurality of second data lines during the touch driving mode of the panel.

12. The display device of claim 1, wherein,
the display driver IC applies a common reference voltage to the plurality of driving electrodes and the plurality of sensing electrodes during the display driving mode of the panel, and
the display driver IC applies a driving pulse according to a timing pulse to the plurality of driving electrodes, and receives a plurality of sensing signals from the plurality of sensing electrodes during the touch driving mode of the panel.

13. The display device of claim 12, further comprising a touch IC configured to output the timing pulse to the display driver IC, and determine whether there is a touch based on the plurality of sensing signals transferred from the display driver IC.

14. A method of driving a display device with an integrated touch screen, the display device including a panel configured to operate in a display driving mode and a touch driving mode, the panel including a plurality of driving electrodes, a plurality of sensing electrodes, and a plurality of data lines including a plurality of first data lines and a plurality of second data lines, the method comprising:
applying data voltages to the plurality of first data lines and the plurality of second data lines during the display driving mode of the panel; and
applying a ground voltage to the plurality of first data lines during the touch driving mode of the panel and floating the plurality of second data lines during the touch driving mode of the panel.

15. The method of claim 14, wherein the plurality of first data lines overlap a part of the plurality of driving electrodes and wherein the plurality of second data lines overlap a part of the plurality of sensing electrodes.

16. The method of claim 14, further comprising:
applying a common voltage to the plurality of driving electrodes and the plurality of sensing electrodes during the display driving mode of the panel; and
applying a driving pulse to the plurality of driving electrodes and receiving a plurality of sensing signals from the plurality of sensing electrodes during the touch driving mode of the panel.

* * * * *